United States Patent
Birch

(10) Patent No.: US 8,167,994 B2
(45) Date of Patent: May 1, 2012

(54) CELLULAR CEMENTITIOUS COMPOSITION

(76) Inventor: Grant Davon Birch, Bridport (AU)

(*) Notice: Subject to any disclaimer, the term of this patent is extended or adjusted under 35 U.S.C. 154(b) by 908 days.

(21) Appl. No.: 12/193,016

(22) Filed: Aug. 17, 2008

(65) Prior Publication Data

US 2009/0050022 A1    Feb. 26, 2009

(51) Int. Cl.
*C04B 38/02* (2006.01)
*C04B 38/10* (2006.01)

(52) U.S. Cl. ........ 106/672; 106/673; 106/679; 106/705; 106/DIG. 1

(58) Field of Classification Search .................. 106/672, 106/673, 679, 705, DIG. 1
See application file for complete search history.

(56) References Cited

U.S. PATENT DOCUMENTS

| | | | |
|---|---|---|---|
| 5,346,549 | A | 9/1994 | Johnson |
| 5,362,319 | A | 11/1994 | Johnson |
| 5,378,279 | A | 1/1995 | Conroy |
| 5,601,643 | A | 2/1997 | Silverstrim et al. |
| 5,658,380 | A | 8/1997 | Dillenbeck |
| 6,722,434 | B2 | 4/2004 | Reddy et al. |
| 6,786,966 | B1 | 9/2004 | Johnson et al. |
| 6,858,566 | B1 | 2/2005 | Reddy et al. |

OTHER PUBLICATIONS

Davidovits, Joseph; Geopolymer Chemistry and Applications (Book) p. 1, 288, 289, 290, 469, 470, 471; Published in 2008 by Institut Geopolymere, Saint-Quentin, France.

*Primary Examiner* — Paul Marcantoni

(57) ABSTRACT

A cementitious slurry and method of making the cementitious slurry comprising mixing a pozzolanic component, a foaming agent of hypochlorite, and a hydroxide solution of soluble hydroxide dissolved in water, whereby the slurry is foamed and hardened into a cellular cementitious composition.

14 Claims, 5 Drawing Sheets

CELLULAR CEMENTITIOUS COMPOSITION

CROSS-REFERENCE TO RELATED APPLICATIONS

This application claims the benefit of the priority document, IP Australia application number 2007904430, a provisional patent application filed on 20 Aug. 2007 in the Commonwealth of Australia by G. D. Birch, inventor and applicant.

FEDERALLY SPONSORED RESEARCH

Not Applicable

SEQUENCE LISTING OR PROGRAM

Not Applicable

BACKGROUND OF INVENTION

1. Field of Invention

This invention relates firstly to cementitious compositions of pozzolanic or geopolymeric type in their plastic state. Geopolymers are meant as compositions as taught by J Davidovits. Secondly, this invention relates to the plastic state compositions' resulting set and hardened compositions. Thirdly, this invention relates to methods of manufacturing both plastic state and hardened state compositions. In particular, the present invention relates to cementitious compositions of a type that may be brought to firstly foam or swell up while in an aqueous plastic state by a chemical foaming agent and also a process, and then secondly set into a hardened mass of hollow cells.

2. Prior Art

Well known methods of foaming a wet cementitious paste or slurry are by adding a gas generating chemical. Well known gas generating chemicals are those that react with an alkali, normally present in the cement slurry, to form hydrogen gas. Aluminium, zinc, or silicon powders are used to react with the alkaline environment present in the cement slurry to form hydrogen gas which causes foam bubbles in the slurry.

A difficulty in using such gas generating powders is that they must be well mixed in just prior to foam processing, since the foaming begins with powder addition and proceeds to completion without further control thereafter. Another difficulty arises when the foaming action is so overpowering as to render the ensuing composition fragile.

Various means of delayed action or slow release of foaming or setting have been proposed in order to design a retarded foaming or setting time. Foaming, retarding, or accelerating chemicals may be further coated by a barrier. Then in turn other chemicals, alone or in combination, attack the barrier coating to expose the underlying chemicals, whose action or reaction has now been delayed. However, although various process outcomes may be thus designed, these processes, once set in motion, are still subject to following along to a set designed outcome. In other words, the outcome cannot be controlled during the process, but is controlled by prior design before the process is activated.

When process control of a foaming and setting process is limited, then the applications of a manufacturing process and, in turn, its articles become limited. Thus it is desirable to have a process that may be retarded or accelerated according to feedback control by external means, such as by heating during the process, rather than by only following along a pre-designed process. This suggested process control, in turn, suggests the possibility of a more controlled process for the manufacturing of cementitious articles.

Fly ash collected from the flues of coal burning power stations is a waste by-product which accumulates around the world for want of wide-spread utilisation. Yet fly ash is a surprisingly well processed composition. Fly ash may be considered as burnt clay, which is already finely divided, homogenous and is chemically reactive with lime to form a type of cement which is termed pozzolanic cement. However, since this pozzolanic cement is, generally speaking, inferior to Portland cement, it is not utilised widely in a pure form, but rather as an additive in Portland cement or as a filler in other compositions. It is therefore desirable to utilise fly ash cement in applications that do not compete with Portland cement applications.

The most widespread applications of foamed and hardened cementitious compounds rely on a process that uses silica sand or Portland cement as its main feedstock ingredient. Silica sand is not a waste product and it requires further pulverising to bring it to a finely divided state suitable for the abovementioned process. It is preferably desirable to increase the utilisation of fly ash waste into useful articles than process silica sand to that end.

In the prior arts of special cement making, calcium hypochlorite has been suggested as an additive to cementitious and fly ash mixtures. However, the calcium hypochlorite is suggested to be used merely as an oxidant of other reactants, or coatings of reactants, in the mix. The reactants are typically impurities found in fly ash, such as sulphite. Another typical reactant is a specially prepared coating on reagent compositions, which coating is oxidised to then expose the reagent composition which may then in turn react in cement mixtures. The purpose of the abovementioned procedure is to gain some measure of process control of cement foaming or setting. This illustrates the trouble taken in the prior art to provide process control. This suggests the importance of foaming and setting process control in particular cement applications.

In the foaming of geopolymers, hydrogen peroxide and other peroxides have been used as foaming agents. Sodium perborate which provides peroxide during a breakdown stage has been suggested for foaming geopolymers. These foaming agents have been suggested for geopolymers manufactured with a component of soluble silicate.

3. Objects and Advantages

It is an object of an embodiment of the invention to provide a foaming agent useful in foaming pozzolanic and certain types of geopolymeric cementitious compositions. The foaming agent is suitable for a type of geopolymeric cementitious composition that does not require a soluble silicate component.

It is another object of an embodiment of the invention to provide an aqueous cementitious slurry that may be further activated to foam and then to set hard by applied heat into useful materials and articles of hardened cellular cementitious composition. This suggests extensive advantages for a production process, when a passive cementitious slurry may be kept in a hopper, handled, and placed in position before being activated by heating means controlled by an operator. In other words, the cementitious slurry may be kept wet in a plastic state and in a mixed and prepared form for a period of time without the foaming and setting process being activated. So the slurry may have a pot life of at least approximately an hour.

When manufacturing a large article that requires placing in stages over a large area, an advantage of having a substantial pot life is suggested in that the foaming may be delayed until all the stages are placed.

For manufacture by continuous process, an advantage of control of process is suggested. This parameter of control is that the amount of foaming and the amount of setting of the composition may be controlled during the process by an operator to some extent. The control of process is an improvement in that it is an external control means that may be applied according to data feedback received during the manufacturing process. This suggests that the control mechanism is then useful for producing quality articles.

An object of a further embodiment of the invention is to provide useful articles of hardened cellular cementitious composition. The suggested advantages are in providing articles with special combinations of useful physical attributes. Some of the desired attributes of the composition may be found in the following list of attributes: lightweight; rigid; high rigidity in relation to density; heat insulating; sound insulating; sound absorbing; fire-resistant; non-combustible; inexpensive; tough; strong; made from waste material; easy formed; easily shaped. Different sets of useful attributes are applicable for different applications.

Notable features of cellular cementitious composition of some embodiments of the invention are substantially evenly-sized thin-walled cells that are strong.

Still further objects of yet other embodiments of the invention are to provide methods of manufacture of aqueous cementitious slurry and of hardened cellular cementitious composition.

SUMMARY OF PRESENT INVENTION

By way of an example of an embodiment of the present invention, a combination of pozzolanic fly ash, sodium hydroxide solution, and bleaching powder or bleaching solution, mixed together to form a cementitious slurry, provides a surprising result in that the slurry at room temperature is stable for some period of time, even many hours, unless the slurry is heated or warmed up. Furthermore, after warming of the slurry another synergistic and surprising result occurs whereby the slurry transforms by swelling, and then setting, into a foamed body of hollow cells.

A process of firstly having a stable slurry and secondly following by a warming operation on it, suggests an advantage in that a slurry placing operation may proceed without undue foaming or setting of the slurry.

A further suggested advantage is that a foaming and setting operation, by means of a warming process, can be applied by an operator or an automatic means, at the opportune moment and by opportune amounts to provide control over the foaming and setting process, and in turn the finished product.

In typical processes, the swelling or foaming of the cementitious slurry, and its subsequent setting or hardening, take place in under an hour, sometimes more typically half an hour, while the processes may even be achieved within a few minutes. The amount of heat within a period of time, absorbed by the slurry and its subsequent foamed body, is the main factor determining the duration of the swelling and setting processes. A more gradual heating however is preferred as it leads to more homogenous and higher quality foaming.

Typically, it is desirable to further cure the hardened cellular cementitious composition by a curing process in order to produce durable and strong product. Generally speaking, the curing is a heating process taking place in a wet or humid environment.

A first preferred curing process is by high pressure steam autoclaving of the composition. Typically, the curing process by high pressure autoclaving takes a few hours. It appears that water or steam heat curing supports the geopolymeric or pozzolanic hardening reactions.

A second preferred curing process is by a heat drying process. However it may be that only one or the other or neither of first or second curing processes may be applied, depending on the type of product that is made. The type of product made will in turn depend on its application.

BROAD STATEMENTS OF THE PRESENT INVENTION

According to a first aspect of the invention, a cementitious slurry is provided which comprises a mixture of
 a pozzolanic component,
 a foaming agent, wherein the foaming agent is a hypochlorite, and
 a hydroxide solution of soluble hydroxide dissolved in water.

According to a second aspect of the invention, a cementitious slurry is provided which comprises a mixture of
 a pozzolanic component, and
 a wet mixture which has been prepared by chemical reaction or by admixing,
  wherein the wet mixture comprises substantial amounts of a hypochlorite on the one hand, and a hydroxide on the other hand, in aqueous solution or suspension at a temperature below approximately 50 degrees centigrade.

According to a third aspect of the invention, a dry cementitious mixture is provided which comprises a substantially dry mixture of
 a dry pozzolanic component,
 a dry hypochlorite component, and
 a dry soluble hydroxide component of about between ten and twenty percent of said dry cementitious mixture,
 whereby the mixture is useful as a pre-packed mix composition for distribution to users who may later mix said dry cementitious mixture with water to form a cementitious slurry.

According to a fourth aspect of the invention, a cellular cementitious composition is provided as a resultant product of a heating process on a cementitious slurry comprising a mixture of
 a pozzolanic component,
 a foaming agent, wherein the foaming agent is a hypochlorite, and
 a soluble hydroxide dissolved in water,
 whereby said heating process provokes foaming of the cementitious slurry to form a foamed and hardened product.

According to a fifth aspect of the invention, a method is provided for preparing a cementitious slurry comprising the steps of
 providing a hydroxide solution component,
 providing a foaming agent, wherein the foaming agent is an alkali metal hypochlorite or an alkaline earth hypochlorite component,
 providing a pozzolanic component, and
 admixing together the pozzolanic component, the foaming agent, and the hydroxide solution component to form a cementitious slurry,
  wherein the temperature of the cementitious slurry is formed and held below about 50° C. and preferably even lower, while the cementitious slurry is placed until it is further processed into durable product.

According to a sixth aspect of the invention, a method is provided for preparing a pre-pack wet mixture comprising the steps of providing a hydroxide solution component at approximately normal room temperature, providing a foaming agent, wherein the foaming agent is an alkali metal or alkaline earth hypochlorite, admixing the foaming agent to the hydroxide solution component to form the wet mixture, wherein the temperature of the wet mixture is kept below about 50° C. and preferably even lower, whereby the wet mixture may be stored or distributed and then later admixed with a pozzolanic component to form a cementitious slurry, and whereby the cementitious slurry is further activated to form cellular cementitious composition.

According to a seventh aspect of the invention, a method is provided for preparing a cellular cementitious composition comprising the steps of providing a hydroxide solution component at normal room temperature, providing a foaming agent component, wherein the foaming agent component is an alkali metal or alkaline earth hypochlorite, providing a pozzolanic component, admixing the foaming agent component to the hydroxide solution component to form a wet mixture, wherein the temperature of the wet mixture is kept below 50° C. and preferably well below 50° C., admixing the pozzolanic component to the wet mixture to form a cementitious slurry, heat processing the cementitious slurry to form a hardened cellular cementitious composition.

According to an eighth aspect of the invention, a method is provided for preparing a cementitious composition comprising the steps of providing a pozzolanic component, providing a supplementary solution comprising at least one dissolved supplementary additive, providing a wet mixture which has been prepared by chemical reaction or by admixing, wherein the wet mixture is comprised of substantial amounts of a hypochlorite on the one hand, and a hydroxide on the other hand, in aqueous solution or suspension, and wherein the temperature of the wet mixture is kept below about 50° C. and preferably even lower, admixing the pozzolanic component to the wet mixture to form a cementitious slurry, heat processing the cementitious slurry to form a foamed body, soaking the foamed body in the supplementary solution, curing the foamed body by either wet or dry heating, or both in a sequence, to form a hardened and cured product.

According to a ninth aspect of the invention, a method is provided for preparing a cellular cementitious composition comprising the steps of providing a cementitious slurry comprised of a pozzolanic component, a foaming agent, wherein the foaming agent is an alkali metal or alkaline earth hypochlorite, and a soluble hydroxide dissolved in water, and then heat processing the cementitious slurry to form a hardened cellular cementitious composition.

Broad Preferred Features of the Invention

Preferably, according to the invention, the hypochlorite and hydroxide are composed of positive ions selected from the group consisting of ammonium, lithium, sodium, potassium, calcium, and magnesium.

Preferably said 'at least one dissolved supplementary additive' of the invention refers to calcium chloride, potassium silicate, or sodium silicate.

Preferably, according to the invention, the heating process is at a temperature of at least about 50° C.

The pozzolanic component mentioned throughout this specification refers to a material that possesses the pozzolanic property of being capable of being activated by adding lime and water to it to provide a set and hardened cementitious cement. But, the pozzolanic component is considered here in this specification without lime or lime activation. So in other words, although lime may perhaps be present in the pozzolanic component, and may provide cementitious activation, it is not a necessary prerequisite of the invention. Rather, the pozzolanic component of the invention is activated mostly by dissolved hydroxide present in the hydroxide solution of the present invention.

A preferred feature of the invention is that the pozzolan or pozzolanic component is substantially comprised of aluminosilicate.

A preferred feature of the invention is that the pozzolan or pozzolanic component is substantially comprised of fly ash.

A preferred feature of the invention is that the pozzolan or pozzolanic component substantially comprises a grade of fly ash suitable for use in Portland cement mixtures.

Preferably further according to the invention, the pozzolan or pozzolanic component is an F-grade of fly ash.

A preferred feature of the invention is that the hypochlorite component is at least one selected from the following group consisting of a bleaching powder, a composition prepared from treating a lime-bearing composition with chlorine gas, a composition comprising an appreciable proportion of calcium hypochlorite, chloride of lime, bleaching solution, sodium hypochlorite, alkali metal hypochlorite, and alkaline earth hypochlorite.

A preferred feature of the invention is that the soluble hydroxide is lithium hydroxide, potassium hydroxide, or sodium hydroxide.

A preferred component of the invention is at least one selected supplementary additive from the following group consisting of gypsum, plaster of Paris, Portland cement, limes, clays, chalk, calcium carbonate, dolomite, concrete and mortar aggregates, magnesium chloride, calcium chloride, sand, silica, amorphous silica, silica fume, potassium silicate, sodium silicate, reinforcing fibres, and reinforcing fibre textile.

Preferred reinforcing fibre of cellular cementitious composition, used as a supplementary additive of the invention, is polypropylene yarn or high tensile polyethylene yarn.

HYPOTHESIS OF THE INVENTION

A following hypothesis is formulated by the inventor of the present invention. The hypothesis is included for the purpose of explaining phenomena of the invention and not for describing or defining the invention, so the inventor and patent applicant do not wish the invention to be bound by the hypothesis in any way.

A characteristic of calcium hypochlorite, a major component in bleaching powder, in the presence of air or water, is that it gives off chlorine gas slowly, which is noticeable by its smell.

Yet it appears that the high alkalinity of the slurry solution of the invention, which is provided by a soluble hydroxide component, stabilises a calcium hypochlorite component so that it no longer gives off chlorine gas. Indeed, in suitable formulations, the wet slurry, its foamed green-set product, and its final cured product exhibit no smell of chlorine.

In other arts, calcium hypochlorite, and especially bleaching powder, is used as an oxidiser. When used as an oxidiser, it reacts on another reagent to oxidise it. However, in the present invention a different method is followed, in that the hypochlorite effectively self-decomposes under the action of heat to provide free oxygen gas. Neither does the hypochlorite decompose substantially to provide free chlorine gas. It appears that the oxygen generation upon warming is also supported by the ambient high alkalinity. It is likely, too, that the many finely divided surfaces in a fly ash component of the slurry contribute to the oxygen gas release.

Although intermediate reactions may take place, the overall decomposition follows:

$$Ca(OCl)Cl \rightarrow CaCl_2 + \tfrac{1}{2}O_2$$

The high alkalinity provided by the soluble hydroxide in solution reacts with aluminium oxide and silicon dioxide, and aluminosilicates, found in a pozzolanic component, to form aluminates, silicates, and other cementitious precursor chemicals when the slurry is heated. The aluminates, aluminosilicate gel formed, and alkaline solution are good bubble surfactants. The surfactant properties hold the foam bubbles that have been formed by the oxygen gas, into shape until the foam sets hard.

The calcium ions released into solution by decomposition of the hypochlorite, in turn react with the aluminates, silicates, aluminosilicates, and other cementitious precursor chemicals to form durable cementitious compounds that set hard.

The sodium ions of a sodium hydroxide component and the chloride ions that are provided from the decomposition of calcium hypochlorite or bleaching powder, form into a sodium chloride salt which is innocuous for most articles. Sodium chloride is the most common salt found in sea water.

So the overall reaction for the non-pozzolanic chemicals is:

$$2NaOH + Ca(OCl)Cl \rightarrow 2NaCl + Ca(OH)_2 + \tfrac{1}{2}O_2$$

$Ca(OH)_2$ is a hydrated lime that in turn reacts with the pozzolanic and its precursor cementitious compounds according to geopolymeric reactions.

In summary, a sodium hydroxide component acts as a catalyst and reactant with fly ash and later as a reactant with the decomposition products of a calcium hypochlorite component. Furthermore, sodium hydroxide provides the highly alkaline medium that stabilises and prevents the calcium hypochlorite from producing chlorine. Sodium hydroxide solution is instrumental in providing a surfactant medium. Sodium hydroxide also provides hydroxide ion to cause aluminosilicate reaction in forming cementitious composition. Sodium hydroxide provides sodium ion to balance aluminium ion valency in aluminosilicate. The calcium hypochlorite provides a benign gas for foaming of the cementitious matrix, while it also provides calcium hydroxide for geopolymeric or pozzolanic reaction with a pozzolanic component, or otherwise provides calcium ion to balance aluminium ion valency in aluminosilicate. Furthermore, the calcium hypochlorite contributes to converting some sodium hydroxide component. The fly ash reacts with sodium hydroxide and the released calcium hydroxide (from calcium hypochlorite decomposition) to form a hardened cellular cementitious composition, but only after first providing a jelly-like matrix very suitable for holding a foam.

So it may be seen that each component has played a role during the process stages in concert with the other components in a surprising manner to produce a useful composition and process.

The useful cellular cementitious composition is typically comprised of quite evenly sized hollow cells that are visible either by naked eye or by magnifying glass. The cells provide the quality of toughness to the composition since cracks require more energy to move across cells. Impacts to the composition are absorbed by collapse of surface cells. Impact energy must pass through cell walls. Yet the cell walls are not lined up straight, thus impact energy may be spread and thus dissipated throughout the composition. The hollow cells provide a lighter composition, and also allow the composition to be more easily cut and dressed to size and shape. Even where cellular cementitious composition is only very slightly foamed and cells are not visible by naked eye, the composition is less likely to crack than unfoamed composition.

Closed cells contribute to making the cellular cementitious composition more heat insulating.

Since a solid cementitious composition of pozzolanic and geopolymeric type can be so strong, it may be useful in certain applications to spread the composition over a larger volume by foaming it. Then a more generally workable composition is provided.

Furthermore, a spread out, or in other words foamed composition, can be more easily reinforced for tensile strength by using common reinforcements, rather than by using high elastic modulus reinforcing for solid composition.

DRAWINGS—FIGURES

DETAILED DESCRIPTION OF THE INVENTION

Figure 1:
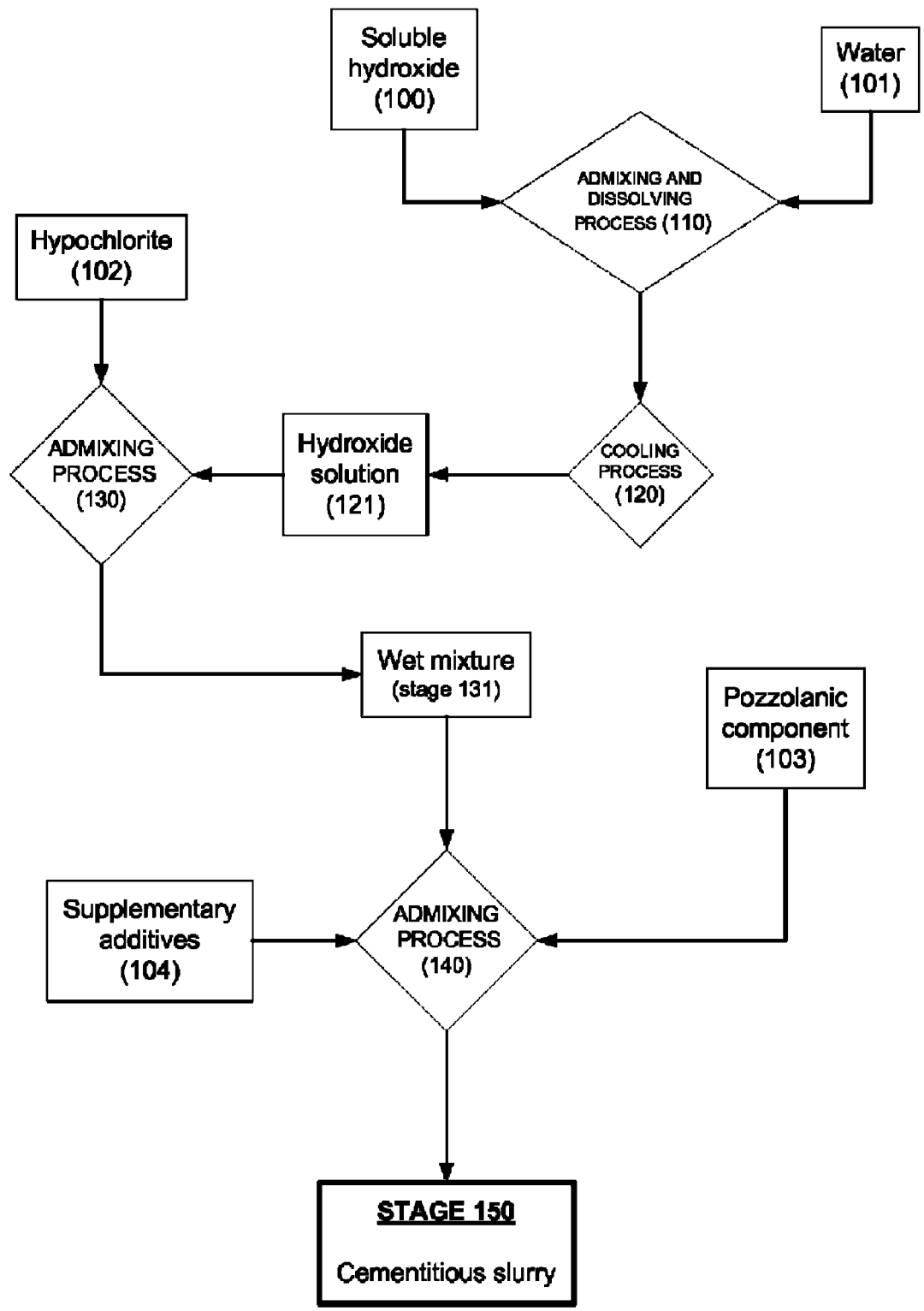
FIG. 1 is a flowchart describing a method of manufacturing cementitious slurry.

FIG. 1 is a diagrammatical flowchart of a process of manufacturing a cementitious slurry of the invention. Flowchart boxes are referenced by a number within.

As will be clear from viewing FIG. 1, cementitious slurry illustrated as stage 150 comprises a pozzolanic component (103) and a wet mixture of stage 131. The wet mixture of stage 131 in turn further comprises a hypochlorite component (102) and a highly alkaline hydroxide solution component (121). The hydroxide solution (121) in turn is comprised of a soluble hydroxide component (100) dissolved in a water component (101). Furthermore, the cementitious slurry shown as stage 150 may or may not comprise one or more optional supplementary additives (104) that have been added and well mixed in.

It is typically useful to provide all the soluble hydroxide (100) and all the water (101) in a solution having an ambient room temperature or even cooler temperature before adding other solids to it, especially so as neither to warm up the wet mixture (131) nor the slurry (stage 150) immediately by any heat of solution.

It is sometimes useful to follow another method of grinding at least some of the pozzolanic component together with dry hypochlorite to evenly disperse the hypochlorite. If other dry ingredients are to be added they will best be incorporated by grinding with other dry ingredients. In any method, wet processing of hypochlorite should be minimised until it is added to a room temperature soluble highly alkaline solution to avoid unwanted spontaneous chlorine emission.

A mixing procedure according to FIG. 1 is to:
1. admixing and dissolving (by process 110) the soluble hydroxide component (100) together with all required water component (101) to form a hydroxide solution (121);
2. cooling (by process 120) the hydroxide solution (121) to ambient room temperature;
3. admixing (by process 130) the entire hypochlorite component (102) to the cooled hydroxide solution (121) to form a wet mixture (131) at room temperature;
4. grinding and mixing the wet mixture of stage 131 further; and
5. adding pozzolanic component (103) and other optional supplementary additives (104) to the wet mixture (131) and mixing well by process 140 to form a cementitious slurry of stage 150.

Another preferred mixing procedure not shown by a flowchart is to generally:
1. add all soluble hydroxide, and any other solubles and solutions, together with all required water to form a solution;
2. cool the solution to ambient temperature;
3. add all the hypochlorite and part of pozzolanic base to part of the cooled solution to form a room temperature wet paste;
4. if a lime component is selected, then it is preferably in the form of a wet putty that has stood for days. The wet putty lime is now added to the wet paste;
5. grind and mix the wet paste (the objective in using only part of solution and part of pozzolanic base is to create the correct consistency for wet grinding and mixing);
6. admix the wet paste to the remaining solution;
7. add and mix all remaining dry components together to form a dry component mix;
8. add the dry component mix to the remaining solution and mix well together to form a cementitious slurry.

To summarise, the critical aspects of mixing operations are briefly that:
1. The heat of solution and any substantial heat must be kept off the hypochlorite component until its decomposition is desired;
2. When the hypochlorite component is combined with any form of water, the water must be already combined in a highly alkaline environment.

The pozzolanic component of the cementitious slurry is any material having known pozzolanic properties. The pozzolanic component may be a reactive aluminosilicate as used in the arts of preparing geopolymer compositions. More preferably, for industrial applications tolerating a lower quality specification, the pozzolanic component is a fly ash on account of its widespread availability and low price.

The hypochlorite component of the cementitious slurry is an alkaline earth or alkali metal hypochlorite or mixture of various alkaline earth or alkali metal hypochlorites. Most preferred is calcium hypochlorite in the form of bleaching powder. Bleaching powder is commercially prepared by treating lime with chlorine gas. Bleaching powder is commercially available as granules for swimming pool chlorination. The bleaching powder allegedly comprises a substantial amount of calcium hypochlorite.

Sodium hypochlorite 15% solution is also preferred, at least as part of the hypochlorite, since it provides very homogenous foam.

The soluble hydroxide component of the cementitious slurry is any substantially soluble hydroxide or a mixture of various substantially soluble hydroxides that provides a highly alkaline solution. Preferably, the soluble hydroxide is sodium hydroxide or potassium hydroxide or a mixture of these.

Commercially available 45%-50% membrane cell caustic soda solutions are a preferred source of soluble hydroxide when the soluble hydroxide will be later dissolved into a hydroxide solution. Typically, sodium hydroxide solutions utilised in examples of the invention, are less than 50% and can thus be prepared from a 50% solution by adding water. A soluble hydroxide may comprise different soluble hydroxides and although a commercially pure grade is preferred, other sources having included impurities are expected to be found suitable.

Supplementary additives are optional components selected from the group of known cements, cement aggregates, and cement enhancers. Examples are gypsum, plaster of Paris, Portland cement, limes, sands, silica, clays, chalk, calcium carbonate, concrete and mortar aggregates, magnesium chloride, calcium chloride, potassium silicate, sodium silicate, dolomite, and reinforcing fibres. Dissolved sodium or potassium silicate as a supplementary additive in the cementitious slurry must be limited to small amounts since good foam bubble formation is negatively affected. A preferred supplementary additive is hydrated and finely ground plaster of Paris. Another preferred supplementary additive is builder's hydrated lime prepared into a wetted putty that has stood for days.

If it is a selected process or stage of the invention, the wet mixture at room temperature of stage 131 shown in FIG. 1 can now be packaged as a pre-pack into sealed buckets, drums and the like for the purpose of storing, and later the distribution to other users for further processing. This further processing is achieved by admixing (140) with a pozzolanic component (103) to form a cementitious slurry (stage 150). Then the cementitious slurry may be utilised by processing in much the same way as will become clear by following this specification.

Furthermore, a room temperature wet mixture of stage 131 may be prepared by specially prepared chemical reaction means rather than by just mixing together the comprising components. Since bleaching powder has been commercially prepared by chlorination of aqueous slurry of lime together with aqueous alkali such as sodium hydroxide, it appears economically advantageous and so preferable on large scale, to utilise just such a process blend of hydroxide and hypochlorite in a solution or a slurry form, rather than by a process of separating out bleaching powder from a highly alkaline solution and later in another process recombining with hydroxide to form room temperature wet mixture of stage 131.

In stage 150 of FIG. 1, the mixed cementitious slurry is kept at room temperature. Preferably after preparing the cementitious slurry, the slurry is left to settle between ten minutes and an hour, before it gets warmed up in further heat processing. This settling appears to contribute to a better quality final product.

The cementitious slurry of stage 150 can now be placed into position for further imminent processing.

Figure 2:
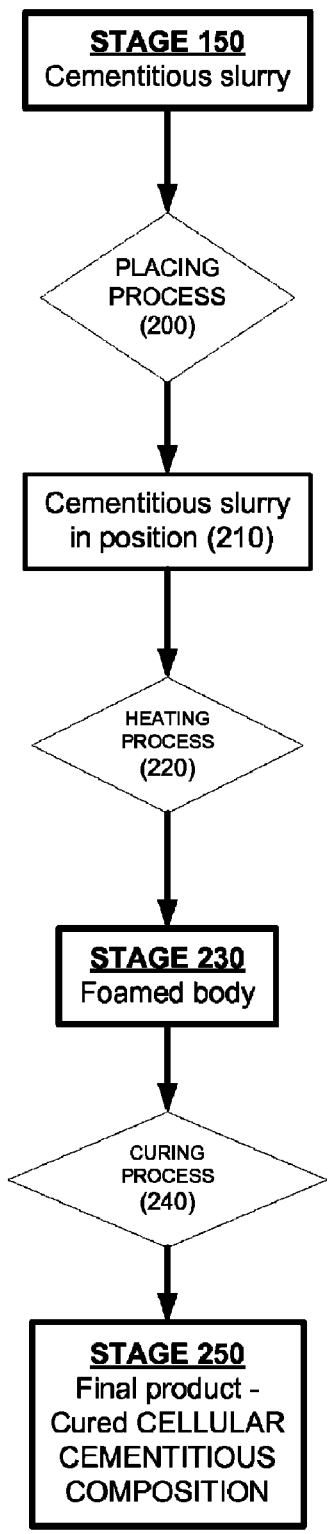
FIG. 2 is a flowchart describing a method of manufacturing cellular cementitious composition.

Refer now to FIG. 2 which is a flowchart illustrating a method of manufacturing a cellular cementitious composition of the invention from cementitious slurry of the invention.

The cementitious slurry of stage 150 first undergoes a placing process (200). The slurry (stage 150) is placed by pouring into a suitable mould having a much larger interior volume than the volume of slurry therein. The objective of a using a larger mould than its slurry contents, is to allow for the increase of volume that occurs by swelling of the slurry. The volume increase due to swelling may be very slight to about twice or more times, according to the selected design of the slurry and subsequent process. Some of the parameters that control the amount of swelling are the viscosity of the slurry, the amount of hypochlorite, and the amount and speed of heating in the heating process.

The moulds are made of solid smooth polyethylene or polypropylene sides.

FIG. 2 shows that between stage 150 and stage 230, the cementitious slurry undergoes a heating process (220) that transforms it to a foamed body of stage 230 which has a green-set strength. For the best foaming results, the heating process (220) should warm up the slurry (210) gently and evenly. The heating process (220) may be effected by placing into a warm oven or into a steam autoclave, or by other known heating methods and means. When control over the foaming and setting process is desired, then the heating means should be controlled with this end in mind. However, the simplest method of heating is to place the mould, containing slurry (210), into an autoclave and heat up the autoclave. Then the mould may remain in the autoclave during a later curing process too. Heating temperatures of process 220 are typically between 70° C. and 120° C., but may vary beyond this range. The speed of foaming and subsequent setting of the slurry between stages 150 and 230 depends on the temperature it is exposed to but also to the ease of warming up, or in other words especially to the heating means employed and to the surface area of slurry exposed to heat.

If the heating process (220) is gradual, the placed cementitious slurry of 210 then gradually swells up as a cementitious foamed body 230 in a plastic state. While the cementitious slurry that is placed into position (210) is foaming into a foamed body of stage 230, heat may be reduced or increased according the required outcome and by the skill of a manufacturing operator. The operator may be a person watching the slurry or may be automatic machinery, using known arts, that senses the amount and speed of foaming in order to control the amount of heating in process 220. Furthermore, the setting into a hardened state of the foamed body at stage 230 is also controllable by the operator according to the temperature and the duration of exposure of the applied heat of the heating process. The heating process (220) may take from a few minutes to about a hundred minutes to cause the foaming and setting in a foamed body of stage 230, according to the amount and speed of heat absorbed. Very broadly speaking, the foaming process depends on temperature, and the setting, or hardening, process depends on the amount and duration of heat applied to the slurry and subsequent foamed body.

Referring again to FIG. 2, it may be seen that a foamed body is formed at stage 230. The foamed body of stage 230 will have a green-set strength representing at least some hardening which should enable the body's transfer to a curing environment without damage. The foamed body of stage 230 is no longer in a plastic state, and has a fixed size and shape, yet it may not yet possess a durable or other desirable quality.

The purpose of the curing environment is to pass the foamed body of stage 230 through a curing process 240 shown in FIG. 2. The curing process 240 transforms the foamed body 230 into a final product of stage 250. The final product of stage 250 is a hardened, durable, cured cellular cementitious composition of the invention.

If the heating process and curing process environment is the same environment, then it will not be necessary to transfer the foamed body of stage 230 to a different curing environment. Steam autoclaving may be applied as both a heating and a curing process as shown by the following examples of the invention.

Another useful manufacturing technique is to construct a process vessel having sides enclosing an interior which is larger in all dimensions than a mould which holds a cementitious slurry (210) and subsequent foamed body (stage 230). The mould is placed and wholly enclosed within the interior of the process vessel. The sides of the process vessel are constructed to provide that the interior of the process vessel is substantially fluid-tight with respect to the exterior of the process vessel. It will be understood that the interior will hold an atmospheric environment surrounding the mould. Now it will be understood that by changing the atmosphere (of the atmospheric environment) by means of provided inlet and outlet pipes leading into the interior of the process vessel, the environment surrounding the mould is changed. Thus various atmospheres may provide varying environments. The various provided environments may in turn provide for various heating, cooling, wetting, drying, or curing processes useful in executing the processes of the invention. Minimal transfer of a foamed body is an advantage achieved by changing its environment rather than moving the body to a different environment.

Now refer to FIG. 2 to see that the foamed body of stage 230 is put through a curing process 240 to strengthen it into a durable final product of cured cellular cementitious composition of stage 250. Typically, the curing process (240) is effected by high pressure steam autoclaving. Atmospheric pressure steam autoclaving may be applied as the curing process but a longer duration of the curing process (240) than at high pressure will be necessary. Moisture curing at ambient room temperatures can also be achieved, but this curing process takes place slowly, so it is not preferred. Typically, high pressure autoclaving is from one hour to about twelve hours or longer. Typically, a good, hard, and durable product is obtained at three hours of high pressure autoclaving. High pressure steaming at about 1200° C. is what is referred to in examples provided in this description. It is expected that high pressure steaming at even higher temperatures will be at least as suitable if not even more so.

In some embodiments and for particular applications of the embodiments, a stage 250 product may be obtained without much, or even without any curing process (240), if the heating process (220) is vigorous enough to apply as a curing process (240) too. For example, when the heating process (220) is hotter or of longer duration than is typical, the foamed body of stage 230 may be considered as a final product of stage 250. Likewise, but vice versa, a steam curing process (240) may be considered as a heating process (220) between stages 210 and 250 in some embodiments.

The final product of stage 250 is a hardened foamed body that comprises a solid mass of hollow cells having cell walls of hardened cementitious composition of the invention. Typically, each cell is substantially closed or sealed off from its neighbours, with small flaws in the form of small openings between cells. A suggested property of the cellular cementitious composition is that the gas or air within the cells does not naturally exchange or move very quickly, yet does have a pathway for slow exchange. This suggested property may point to useful applications by those skilled in particular arts, such as acoustics and insulation. This suggested property appears to be the reason why some embodiments of hardened cellular cementitious compositions can float on water for many days and thus show that the hollows of the cells are not substantially flooded.

Figure 5:
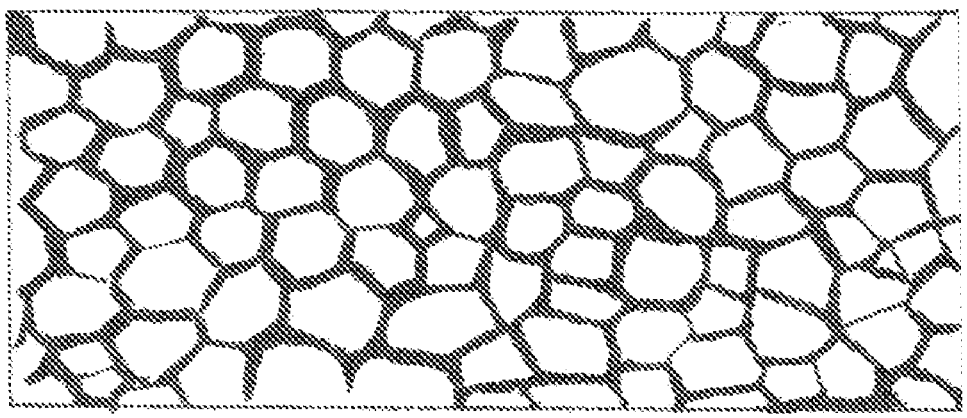
FIG. 5 is an illustration of a magnified cross section through cellular cementitious composition.

It must be understood that in many embodiments of cellular cementitious composition, the cells are not visible to the naked eye, while in other embodiments they are. Refer now to FIG. 5 which shows an artist's illustration of a thin slice of cellular cementitious composition magnified about ten times larger. Note the cell walls shown in black ink, while they enclose hollow empty spaces to form cells. In fact, the cells are more homogenous in size than FIG. 5 shows, since some cells have been sliced through the middle while others have been sliced through nearer to an edge. To explain in other words, the cells are not packed in regular rows even though they are of a similar size.

If cellular cementitious composition of a specific application requires a further treatment by a solution, it is difficult to achieve since the composition does not absorb solution quickly under normal circumstances. Therefore, a solution treatment for perhaps the purpose of leaching out soluble salts from the composition will now be explained.

If a hot cellular cementitious composition is allowed to cool while in contact with water or a solution, it tends to absorb much more solution into the interior of its cells, and become 'waterlogged' or soaked, so to speak. This soaking by cooling process is probably because the air in a cell will be contracting as it cools. Also, the opposite will occur when the soaked cellular cementitious composition is warmed up—vapour pressure will expel a great proportion of liquid from cell interiors and even cell walls.

So to utilise this absorbing and expelling effect to leach out a salt from the cellular cementitious composition, the composition should undergo a cooling and heating cycle or even a series of reiterated cycles, if starting from a hot state. Firstly, clean cool water is added to a hot cellular cementitious composition. Secondly, in the presence of the water, the composition is allowed to cool and absorb the water, until composition and water are close to room temperature and composition is soaked. Excess water may be drained off. Thirdly, a warming process is applied by a heating means which may be simply a warm air current passing over the composition. While the composition warms up to a maximum temperature, it expels liquid. The expelled liquid, a solution containing leached salts, can then be drained off. The warm composition may undergo a reiteration of the same above-mentioned cooling and heating cycle, if further leaching is desired.

It is also useful to absorb or uptake a supplementary additive in solution into a cellular cementitious composition by exposing the composition to vacuum while in the presence of the solution. A vacuum pump is applied to a vacuum vessel which contains both composition and solution together. The solution is quickly sucked into the composition.

Figure 3:
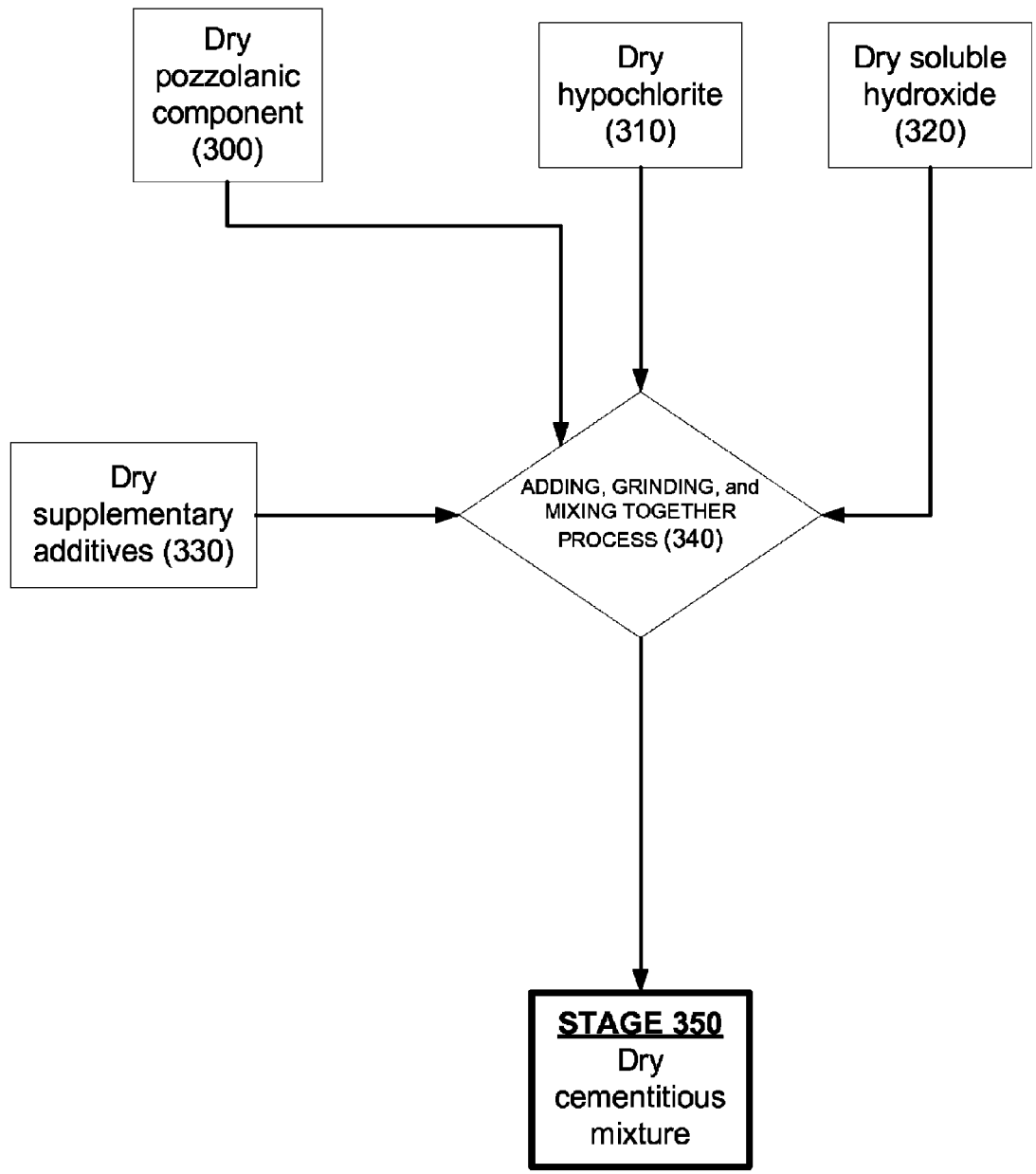
FIG. 3 is a flowchart describing a method of manufacturing dry cementitious composition.

Reference to FIG. 3, illustrating a flowchart, will show a method of preparing a dry cementitious mixture of the invention. A dry cementitious mixture of stage 350 comprises a dry pozzolanic component (300), a dry hypochlorite (310), and a dry soluble hydroxide (320). The dry cementitious mixture (stage 350) may be enhanced by the optional addition of dry supplementary additives (330).

Preferably, the dry pozzolanic component is fly ash of similar good quality and fineness as used for concrete or cement making, the hypochlorite is bleaching powder of a good quality as used in swimming pools, and the dry soluble hydroxide is solid caustic or potash ash or otherwise a technical grade of sodium or potassium hydroxide in the form of solid flake or pearl. Preferred dry supplementary additives (330) are hydrated calcium hydroxide of the type used as dry builder's lime, and a dry Plaster of Paris that has previously been hydrated, dried, and then ground.

There is no critical order of the mixing together of the comprising components of the dry cementitious mixture of stage 350. It is best to grind all components together to form particles that are coated by other fine particles. The dry cementitious mixture of stage 350 is packed into drums or similar containers as a pre-packed mix which may then be stored and distributed to various users. The various users may keep the pre-packed mix (stage 350), within its shelf life, until required for use. It is important to keep the cementitious mixture (stage 350) in a dry state until it is to be used. When the dry cementitious mixture (stage 350) is packaged as a pre-packed mix it is preferably kept in air tight bags in further air-tight drums, pails, tanks and the like, to minimise atmospheric moisture uptake.

Figure 4:
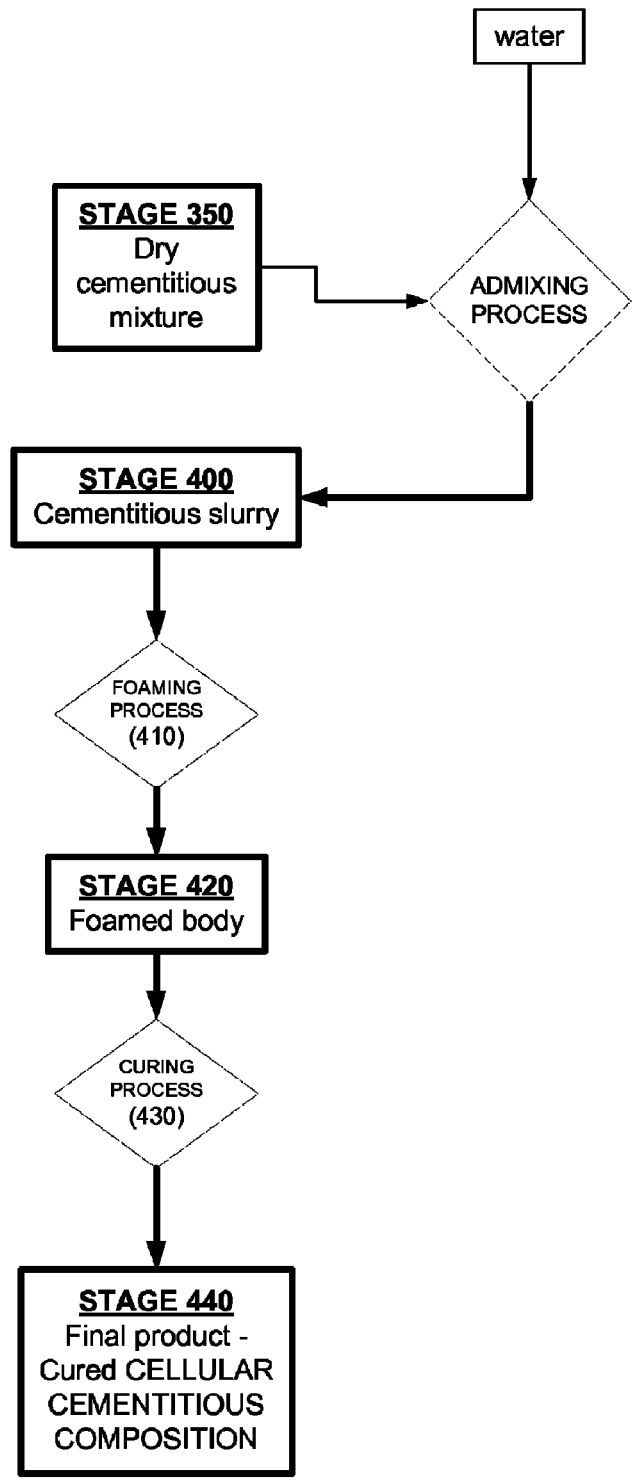
FIG. 4 is a flowchart describing a method of manufacturing cellular cementitious composition from dry cementitious mixture.

Refer now to FIG. 4 to see a flowchart of processes and stages that the dry cementitious mixture of stage 350 undergoes when used by a user. The user then mixes the pre-packed mix of stage 350 with water to form cementitious slurry of stage 400. Since a great amount of heat is generated by the dissolving of the soluble hydroxide component within the mixture, the internally generated heat acts to form substantially warm cementitious slurry of stage 400. The slurry (400) must follow a foaming process (410) to form a foamed body of stage 420. Since the internally heat is insufficient to provoke much foaming, if substantial foaming is required by the user, it will be necessary to provide a heating means to heat process the slurry (400) during the foaming process (410).

The foamed body (stage 420) preferably then follows a curing process (430) to set and harden into a final product of cured cellular cementitious composition of stage 440. The final product is a durable, hardened and cured cellular cementitious composition. The curing process may be by aging in a moist atmosphere, or by wetting and warming, or by steaming.

In a preferred method, cementitious slurry of stage 420 in FIG. 4 is equivalent to cementitious slurry of stage 150 shown in FIG. 2. Then the cementitious slurry provided from a pre-pack dry cementitious mixture is further processed as in FIG. 2.

EXAMPLES

In the following examples the postscript 'ml' refers to a volume in millilitres. The postscript 'g' refers to a mass in grams. The abbreviation s.g. refers to the specific gravity of a solution in grams per millilitre. Procedures in the examples are followed in sequence as they are written.

The component compositions used in these examples were obtained from the following sources:

'Lethabo fly ash for concrete' was supplied by Ash Resources Pty Ltd incorporated in the Republic of South Africa.

'Gladstone/Callide blend fly ash' was provided from Melbourne depot of Cement Australia.

'HTH chlorine granules' used for swimming pool chlorination was obtained from Protea Industrial Chemicals, a division of Protea Chemicals Pty Ltd incorporated in Republic of South Africa.

Sodium hydroxide membrane cell caustic soda solution 47% min was manufactured by NCP Chloorkop in South Africa, but supplied by Protea Industrial Chemicals. The solution was kept at a specific gravity (s.g.) of 1.500 @20° C. by topping up and dissolving sodium hydroxide solid pellets when necessary to raise a lowered s.g. due to atmospheric moisture absorption over periods of time.

Lime was a white dry hydrated lime from builders' suppliers.

Plaster of Paris used was a retail grade for modelling purposes. It was mixed with water to form a slurry which quickly hardened to a set mass. The set mass was dried in ambient conditions, then ground up into a powder and the resulting powder of hydrated Plaster of Paris was used in the example.

Sodium hypochlorite solution 12-15% s.g. 1.22–1.21@24° C. was supplied by Protea Industrial Chemicals Sodium silicate solution 'Silchem 3379' supplied by Crosfield, now Ineos silicas South Africa Pty Ltd. Total solids are 37.85; ratio $SiO_2$: $Na_2O$ is 3.3

All of the above chemicals are available in many parts of the world, and are not particularly special. Ineos and HTH are worldwide corporation names.

Example 1

Components
Lethabo fly ash=360 g
47% sodium hydroxide solution=120 ml
Water=40 ml
HTH chlorine granules=60 g Method:
Add and mix water to the 47% sodium hydroxide solution to form a hydroxide solution. Mix and grind HTH granules into the hydroxide solution using a pestle and mortar to form a wet mixture at approximately ambient room temperature. Add and mix all the fly ash, a pozzolanic component composed of substantial amounts of reactive aluminosilicate, to the room temperature wet mixture in a 2 litre polythene container to form a cementitious slurry. Leave the slurry for half an hour to settle into a pasty consistency. Place the container with the slurry into a kitchen pressure cooker and autoclave for 3 hours, topping up the pressure cooker with water at hourly intervals. A cured, hardened and lightweight product of cellular cementitious composition is the result that may be dropped out of the container.

Example 2

Components
Lethabo fly ash=300 g
47% sodium hydroxide solution=100 ml
Water=10 ml
HTH chlorine granules=30 g Method:
Add and mix the water component to the sodium hydroxide solution component to form a hydroxide solution. Mix and grind the HTH granules component into the hydroxide solution using a pestle and mortar to form a room temperature wet mixture. Add and mix the fly ash, a pozzolanic component, to the room temperature wet mixture in a 2 litre polythene container to form a cementitious slurry. Leave the slurry for fifteen minutes to settle into a pasty consistency. Place the container with the slurry into an oven at 50° C. for 45 minutes to allow for foaming and setting of the slurry into a foamed body. Place the foamed body into a kitchen pressure cooker and autoclave for 4 hours, topping up the pressure cooker with water at hourly intervals. A cured, hardened and lightweight product of cellular cementitious composition is the result that may be dropped out of the container.

Example 3

Components
Lethabo fly ash=120 g
47% sodium hydroxide solution=45 ml
HTH chlorine granules=45 g Method:
Mix and grind the HTH granules component into the 47% sodium hydroxide solution component using a pestle and mortar to form a room temperature wet mixture. Add the fly ash component to the room temperature wet mixture in a 2 litre polythene container and mix for ten minutes to form a cementitious slurry. Place the container with the slurry into an oven at 70° C. (that also holds an open dish of water for the purpose of keeping a high humidity) for 25 minutes. Place the container into a kitchen pressure cooker and autoclave for 3 hours, topping up the pressure cooker with water at hourly intervals. A foamed, cured, hardened and lightweight product of cellular cementitious composition is the result that may be dropped out of the container.

Example 4

Components
Lethabo fly ash=120 g
47% sodium hydroxide solution=45 ml
HTH chlorine granules=35 g
Water=15 ml
Wet lime putty=10 ml Method:
Add and mix the water component to the sodium hydroxide solution component to form a hydroxide solution. Mix and grind the HTH granules component and the wet lime putty component into the highly alkaline hydroxide solution using a pestle and mortar to form a room temperature wet mixture. Leave the room temperature wet mixture to stand for 45 minutes. The wet mixture may be kept in sealed airtight containers as a pre-pack mixture. Add the fly ash component to the wet mixture in a 2 litre polythene container and mix for ten minutes to form a cementitious slurry. Place the container with the slurry into an oven at 90° C. (that also holds an open dish of water for the purpose of keeping a high humidity) for 20 minutes. Expose the container and its foamed body contents to steam in the oven at normal pressure for ten minutes. Place the container into a kitchen pressure cooker and autoclave for 3 hours, topping up the pressure cooker with water at hourly intervals. Take out a foamed and cured product and leave in a clean-water bath until the cured product has cooled to room temperature and soaked up water. Place the product into an oven at 60° C. and dry out. A cured, hardened and lightweight product of cellular cementitious composition is the result.

Example 7

Components
Lethabo fly ash=360 g
47% sodium hydroxide solution=180 ml
Sodium hypochlorite 12% solution=80 ml
Calcium chloride 37% solution s.g. 1.360=400 ml
Water=600 ml Method:

Add and mix the hypochlorite solution component to the sodium hydroxide solution component to form a room temperature wet mixture. Add the fly ash component to the wet mixture in a 2 litre polythene container and mix for ten minutes to form a cementitious slurry. Allow the slurry to settle for 15 minutes. Place the container with its slurry into an oven at 95° C. for one hour to form a foamed body. Prepare a weak calcium chloride solution, as a supplementary solution, by adding and dissolving the 600 ml water component to the 37% calcium chloride solution component. Pour the weak calcium chloride solution over the hot foamed body and into the container. Leave the foamed body until it has cooled to room temperature and soaked up a lot of the weak calcium chloride solution. Place the container with the foamed body into a kitchen pressure cooker and autoclave for 4 hours, topping up the pressure cooker with water at hourly intervals. Place a resulting product into an oven at 40° C. and dry it out. A cured, hardened and lightweight product of cellular cementitious composition and having larger cells is the result.

Example 8

Components
  Lethabo fly ash=360 g
  47% sodium hydroxide solution=120 ml
  Water=50 ml
  Sodium hypochlorite 12% solution=80 ml
  HTH chlorine granules=25 g
  Sodium silicate solution=(Silchem 3379=120 ml)+(water=180 ml)

Method:

Add and mix the hypochlorite solution component and the 50 ml water component to the sodium hydroxide solution component to form a room temperature wet mixture. Add the fly ash component to the room temperature wet mixture in a 2 litre polythene container and mix to form a cementitious slurry. Allow the slurry to settle for 35 minutes. Place the container with the slurry into an oven at 70° C. for one hour to form a foamed body. Place the container with the foamed body into a kitchen pressure cooker and autoclave for 4 hours, topping up the pressure cooker with water at hourly intervals. Prepare the sodium silicate solution component by adding and dissolving a 120 ml Silchem 3379 component to a 180 ml water component. Pour the prepared sodium silicate solution over the foamed body, while still hot, and into the container. Leave the foamed body until it has cooled to room temperature and soaked up the sodium silicate solution. Place the container with the sodium silicate solution and the foamed body into vacuum vessel. Apply a vacuum by means of a lab water vacuum pump for one minute. Take the foamed body out of the vacuum vessel and the container and place the foamed body into a drying oven at a temperature of 110° C. and dry it out for three hours. A cured, hardened product of cellular cementitious composition is the result.

Example 9

Components
  Gladstone/Callide blend fly ash=300 g
  Dry sodium hydroxide pearl=55 g
  HTH chlorine granules=30 g
  Water=90 ml Method:

Add and mix all the dry components namely the fly ash, sodium hydroxide, and HTH, and grind together in mortar and pestle to form a dry cementitious mixture. The dry cementitious mixture may be kept dry in airtight containers as a pre-packed mix. Take all of the above dry cementitious mixture and quickly mix well with the water component of 90 ml in a container, used as a mould, to form warm cementitious slurry. Cover the container with a lid or polythene sheet. Place the container in an oven set at 90° C. for one hour. The slurry will foam and set into a foamed body while in the oven. Cure the foamed body by placing the container into a kitchen pressure cooker and autoclave for 3 hours, topping up the pressure cooker with water at hourly intervals. Take out cured cellular cementitious composition product.

SCOPE AND RAMIFICATIONS

The scope of the invention is not limited to details described and illustrated. Since the invention concerns various compositions and methods of making them, the compositions may be utilised in varied applications, including applications with other compositions. Those skilled in the arts may vary details according to various applications yet still remain within the broad scope of the invention.

For example, a useful substitute for timber may be provided as an embodiment of the present invention when polypropylene micro fibre reinforces cellular cementitious composition. The timber substitute can be nailed, screwed, sanded and cut in much the same way as timber. Such a timber substitute has advantageous properties of being substantially made from waste or mineral material rather than by cutting down of forests, and not being as subject to warping, combustion, or insect attack as natural timber.

I claim:

1. A cementitious slurry which comprises a mixture of
  a pozzolanic component,
  a foaming agent, wherein the foaming agent is a hypochlorite, and
  a hydroxide solution of soluble hydroxide dissolved in water, whereby the slurry is foamed and hardened into a cellular cementitious composition.

2. The cementitious slurry of claim 1 wherein the hypochlorite is an alkaline earth hypochlorite or an alkali metal hypochlorite.

3. The cementitious slurry of claim 1 wherein the soluble hydroxide is an alkali metal hydroxide.

4. The cementitious slurry of claim 1 wherein the hypochlorite is selected from the group consisting of lithium hypochlorite, sodium hypochlorite, and calcium hypochlorite, and wherein the hydroxide is selected from the group consisting of sodium hydroxide and potassium hydroxide.

5. The cementitious slurry of claim 4 wherein the pozzolanic component comprises aluminosilicate.

6. A cellular cementitious composition resulting as a product of a heating process on the cementitious slurry of claim 5.

7. The cementitious slurry of claim 5 wherein the pozzolanic component is fly ash.

8. A cellular cementitious composition resulting as a product of a heating process on the cementitious slurry of claim 7.

9. A dry cementitious mixture which comprises a substantially dry mixture of
  a dry pozzolanic component,
  a dry hypochlorite component, and
  a dry soluble hydroxide component of about between ten to twenty percent by weight of said dry cementitious mixture,
whereby the mixture is useful as a pre-packed mix composition for distribution to users who may later mix said dry cementitious mixture with water to form a plastic state cementitious slurry, which may in turn be set into a hardened cementitious composition.

10. A cellular cementitious composition resulting as a product of a heating process on a cementitious slurry which comprises a mixture of
   a pozzolanic component,
   a foaming agent, wherein the foaming agent is a hypochlorite, and
   a soluble hydroxide dissolved in water,
whereby said heating process provokes foaming of the cementitious slurry to form a foamed and hardened product of cellular cementitious composition.

11. A method for preparing cementitious slurry comprising the steps of:
   providing a hydroxide solution component,
   providing a foaming agent, wherein the foaming agent is an alkali metal hypochlorite or an alkaline earth hypochlorite component,
   providing a pozzolanic component, and
   admixing together the pozzolanic component, the foaming agent, and the hydroxide solution component to form a cementitious slurry,
whereby the cementitious slurry is further processed into durable product.

12. A method for preparing a pre-pack wet mixture comprising the steps of:
   providing a hydroxide solution component at approximately normal room temperature,
   providing a foaming agent, wherein the foaming agent is an alkali metal or alkaline earth hypochlorite,
   admixing the foaming agent to the hydroxide solution component to form the wet mixture,
      wherein the temperature of the wet mixture is kept below 50° C., whereby the wet mixture may be stored or distributed and then later admixed with a pozzolanic component to form a cementitious slurry, and whereby the cementitious slurry is further activated to form cellular cementitious composition.

13. A method for preparing a cellular cementitious composition comprising the steps of:
   providing a cementitious slurry comprised of:
      firstly, a hydroxide solution component comprising an alkali metal hydroxide dissolved in water,
      secondly, a foaming agent component, wherein the foaming agent is an alkali metal hypochlorite or an alkaline earth hypochlorite, and
      thirdly, a pozzolanic component, substantially comprised of aluminosilicate with pozzolanic properties,
   and heat processing the cementitious slurry to form a hardened foamed body of said cellular cementitious composition.

14. The method for providing a cellular cementitious composition of claim 13 with additional steps of:
   providing a supplementary solution selected from the group consisting of calcium chloride solution, potassium silicate solution, and sodium silicate solution,
   soaking the foamed body in the supplementary solution, and curing the foamed body by either wet or dry heating, or both in a sequence, to form a hardened and cured product.

* * * * *